United States Patent [19]

Shinsen

[11] Patent Number: 4,582,153

[45] Date of Patent: Apr. 15, 1986

[54] SUSPENSION ASSEMBLY FOR TRACK-TYPE VEHICLE

[75] Inventor: Mitsuhisa Shinsen, Komatsu, Japan

[73] Assignee: Kabushiki Kaisha Komatsu Seisakusho, Tokyo, Japan

[21] Appl. No.: 573,996

[22] Filed: Jan. 26, 1984

[51] Int. Cl.⁴ ............................................. B62D 55/06
[52] U.S. Cl. ................................................... 180/9.5
[58] Field of Search ...................... 180/9.5, 9.52, 9.54, 180/9.56, 9.58, 9.6

[56] References Cited

U.S. PATENT DOCUMENTS

| | | | |
|---|---|---|---|
| 1,317,652 | 9/1919 | Holt | 180/9.54 |
| 3,189,116 | 6/1965 | Steffen | 180/9.5 |
| 4,018,295 | 4/1977 | Hasselbacher | 180/9.5 |

Primary Examiner—John A. Pekar
Attorney, Agent, or Firm—Armstrong, Nikaido, Marmelstein & Kubovcik

[57] ABSTRACT

A suspension assembly for suspending a vehicle body between track frames located at both sides of the vehicle body comprises a pair of movable links each having one end pivotally connected to each of pivot shafts horizontally extending outwards from both sides of the vehicle body and the other end pivotally connected to a rear or intermediate portion of the track frame and an equalizer bar. Each end of the equalizer bar is provided with a spherical bearing into which a pivot shaft connected to the track frame on the slightly front side from the intermediate portion thereof is slidably inserted. The suspension assembly further comprises shock absorber means pivotally connected between both side of the rear part of the vehicle body and the respective rear parts of the track frames.

8 Claims, 8 Drawing Figures

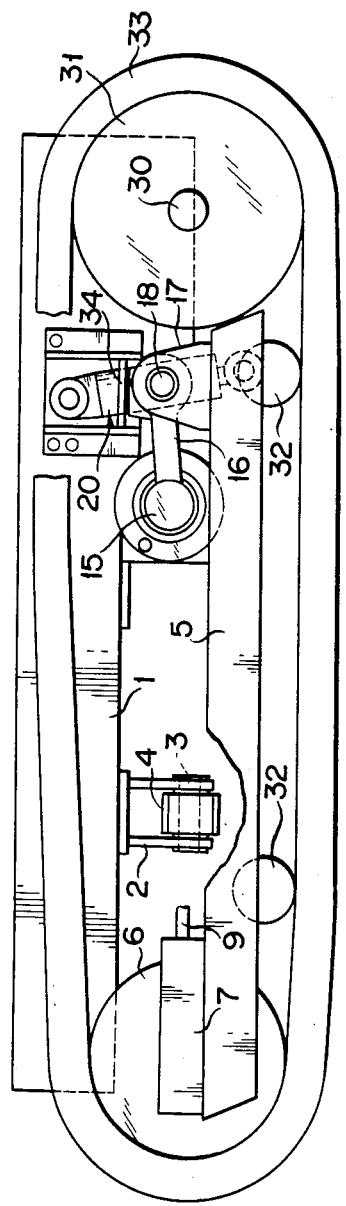
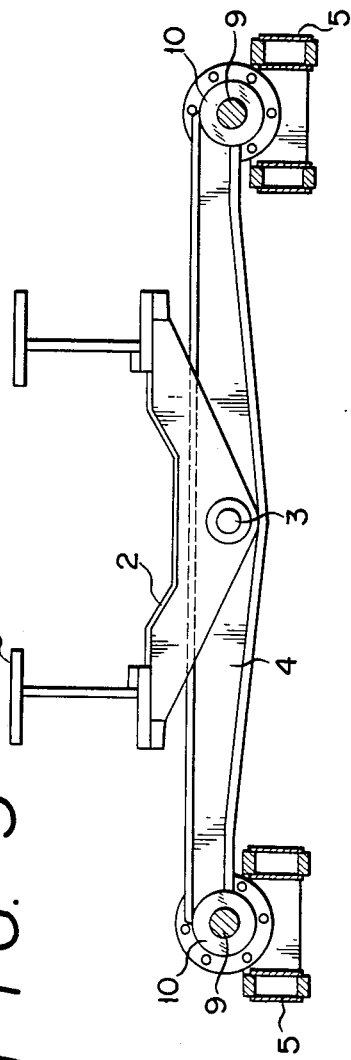
FIG. 2
FIG. 3

SUSPENSION ASSEMBLY FOR TRACK-TYPE VEHICLE

BACKGROUND OF THE INVENTION

1. Field of the Invention

This invention relates to suspension assemblies for track-type vehicles, and more particularly to a suspension assembly which enables respective front and rear sides of track frames pivotally mounted on both sides of the vehicle body to the main frame thereof to move upwards and downwards, and which can lock movements of the respective rear sides of the track frames.

2. Description of the Prior Art

As for suspension assemblies for track-type vehicles which have so far been well known and employed, there is a system (a first prior art example) wherein track frames are completely fixed to the vehicle body, another system (a second prior art example) wherein the front sides of track frames are vertically movably supported to the vehicle body through an equalizer bar and the rear sides thereof are pivotally mounted on pivot shafts extending horizontally on both sides of the vehicle body, and a further system (a third prior art example) wherein, in addition to the arrangement of the second prior art example, lower bogie wheels are resiliently supported relative to track frames.

However, the suspension assembly according to the aforementioned first prior art example is disadvantageous in that since the shock from the road surface is transmitted directly to every part thus giving less comfortable riding and reducing the durability of the component parts of the vehicle.

The suspension assembly according to the above-mentioned second prior art example has been employed in most of track-type vehicles and is considerably improved as compared with the first prior art first example, but is inferior to the third prior art example in respect of comfortableness in driving.

The aforementioned suspension assembly according to the third prior art example gives comfortable driving of the vehicle, but is complicated in construction and expensive to manufacture. Further, the vehicle body becomes unstable during operation because of running by endless track chains supported by resilient suspension wheels. Therefore, the suspension assembly of this system is disadvantageous in that it gives inferior operability.

SUMMARY OF THE INVENTION

The present invention has been devised to improve the above-mentioned disadvantages of the prior art suspension assemblies, and has for its object to provide a suspension assembly for track-type vehicles which gives improved comfortable driving of the vehicle and improved durability of component parts thereof.

Another object of the present invention is to provide a suspension assembly for track-type vehicles which has a simple construction and is inexpensive to manufacture.

A further object of the present invention is to provide a suspension assembly for track-type vehicles which enables the vehicle body to be kept in stable condition.

To achieve the aforementioned objects, according to the present invention, there is provided a track-type vehicle having a main body, a main frame and a suspension assembly. This suspension assembly comprises a pair of left and right track frames mounted on both sides of a main frame; a pair of left and right pivot shafts extending horizontally on both outsides of the main frame; a pair of left and right movable links each having one end pivotally connected to each of said pivot shafts and the other end pivotally connected through a pivot shaft to each of brackets projecting from the upper surfaces of said track frames; shock absorber means pivotally connected between both sides of the rear part of the main frame and respective rear parts of said track frames; an equalizer bar pivotally mounted on the part of said main frame which is slightly forward of the longitudinal intermediate portion thereof and on the transversely central, lower part of the vehicle body, the vertically freely movable both ends of said equalizer bar extending, respectively, to the track frames; means for slidably connecting both ends of said equalizer bar and the parts of said track frames where are slightly forward of the track frames; and control means for controlling the shock absorbing action of said shock absorber means.

According to a further aspect of the present invention, there is provided a track-type vehicle characterized in that each of said shock absorber means comprises a suspension cylinder whose one end is pivotally connected to the vehicle body and a piston which is slidably fitted into said cylinder and whose one end is pivotally connected through a rod to each of the track frames, said cylinder having a bottom side pressure chamber separated by said piston which is filled with a high pressure inert gas.

Further, according to the present invention, there is provided a track-type vehicle characterized in that each of said connector means comprises a spherical bearing mounted on each end of the equalizer bar and a rod inserted slidably in its axial direction into said bearing so as to be located in parallel with the track frame whose one end is connected to a bracket means for carrying an idler sprocket wheel and whose the other end is connected to an idler sprocket wheel biasing means fixedly secured to the upper surface of the track frame where is an approximately intermediate portion of the track frame.

Still further, according to the present invention, there is provided a track-type vehicle characterized in that each of said connector means comprises a spherical bearing mounted on each end of the equalizer bar and a pivot shaft inserted slidably in its axial direction into said bearing so as to be located in parallel with the track frame and whose both ends are projected out from pivotally each end of the bearing and pivotally connected to a pair of brackets fixedly mounted on the upper surface of the track frame.

Further, according to the present invention, there is provided a track-type vehicle characterized in that said control means comprises a pressure chamber defined on the rod side of said suspension cylinder, a hydraulic pump, a pressurized fluid conduit connecting said pressure chamber and said hydraulic pump; a connection and disconnection changeover solenoid valve installed in said fluid conduit; a pair of suspension lock solenoid changeover valves installed in said conduit between said connection and disconnection changeover solenoid valve and said pressure chamber; and an electric switch adapted to actuate said pair of solenoid changeover valves.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

BRIEF DESCRIPTION OF THE DRAWINGS

FIG. 2 is a schematic, fragmentary longitudinal side elevational view of track portion of a track-type vehicle having one embodiment of suspension assembly according to the present invention mounted thereon;

FIG. 3 is a schematic plan view showing partially longitudinal section taken along line III—III in FIG. 1;

DETAILED DESCRIPTION OF THE PREFERRED EMBODIMENTS

Figure 1:
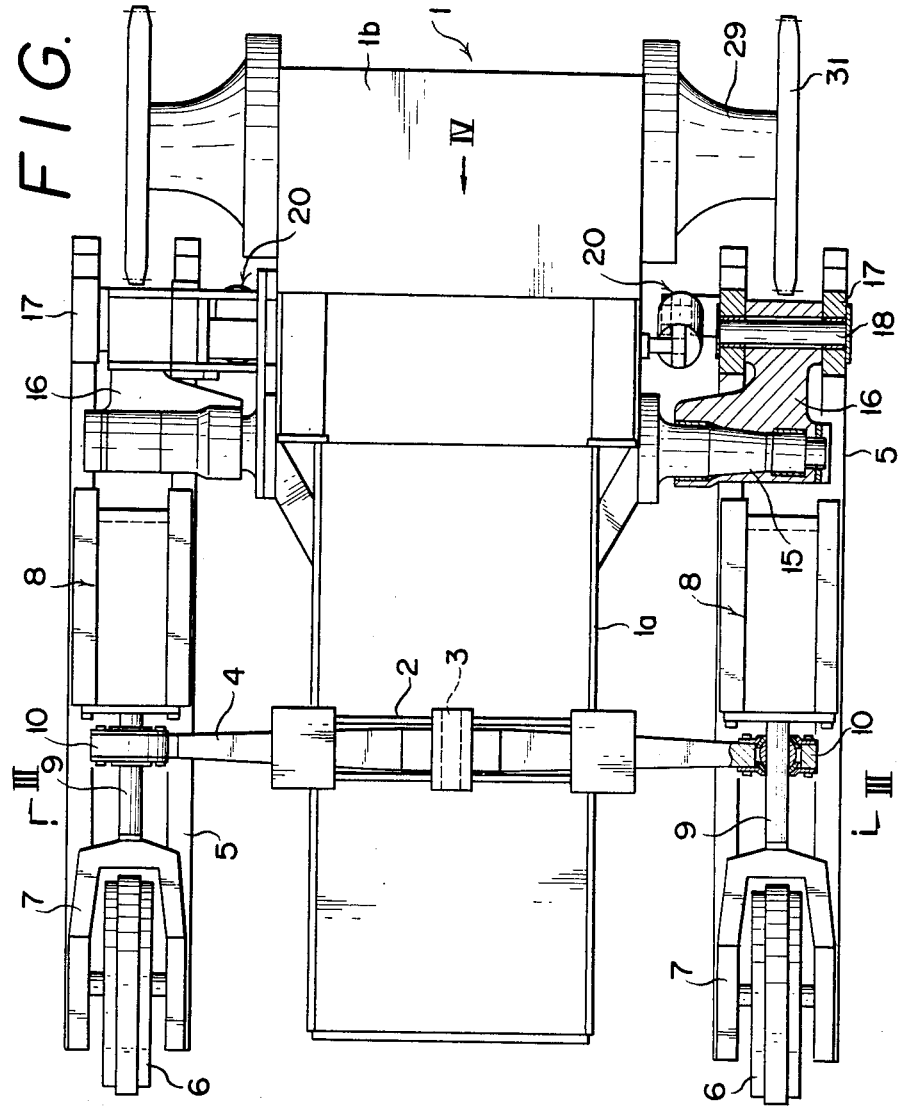
FIG. 1 is a schematic, fragmentary plan view of a track-type vehicle having one embodiment of suspension assembly according to the present invention mounted thereon.
Figure 4:
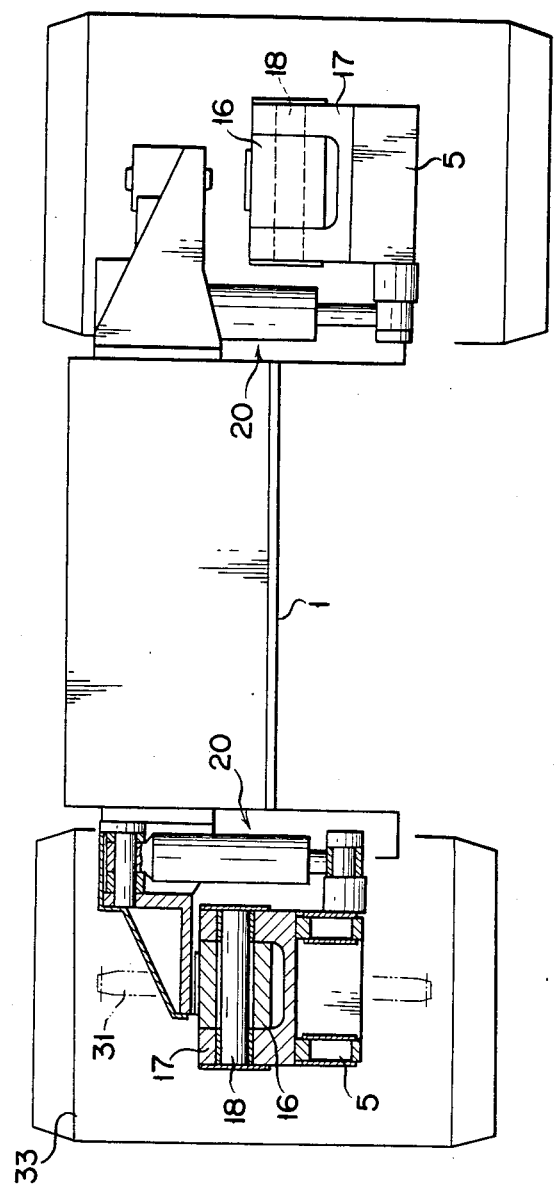
FIG. 4 is a schematic fragmentary view taken along arrow IV in FIG. 1.
Figure 5:
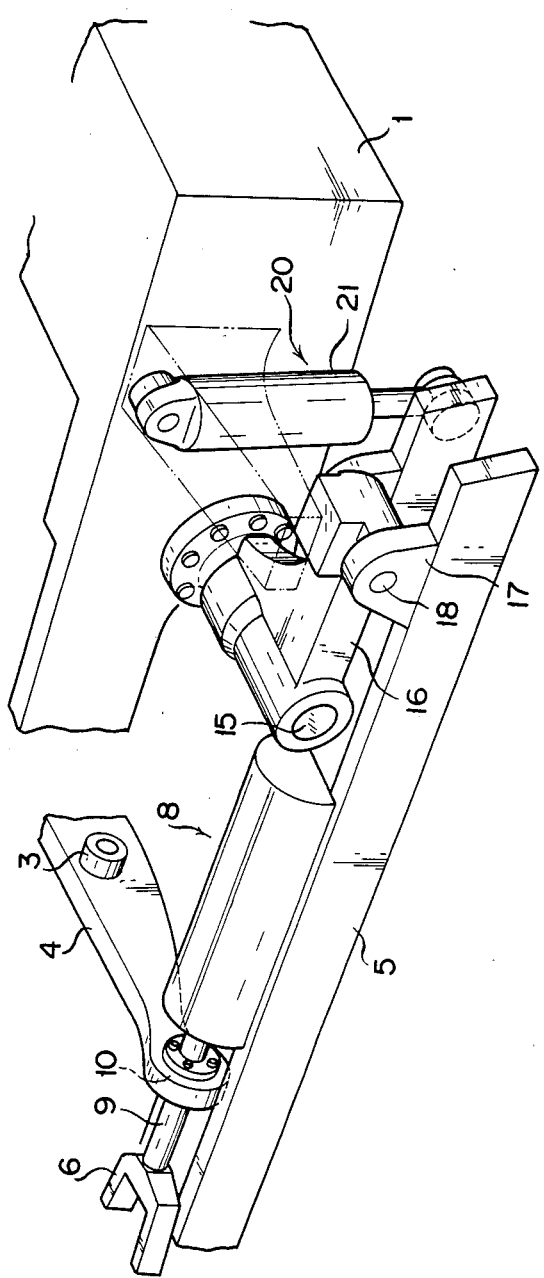
FIG. 5 is a schematic perspective view of the main part of one embodiment of suspension assembly according to the present invention.

Reference is now made to FIGS. 1 to 5. Reference numeral 1 denotes a track-type vehicle body. The vehicle body 1 comprises a forwardly projected main frame 1a, and a body 1b containing an engine. A support member 2 extends in the portion of the main frame 1a which is slightly forward of the longitudinal intermediate portion thereof and in the central, lower part of the vehicle body. An equalizer bar 4 is oscillationally supported at its central part thereof through a pin 3 by the central part of the support member 2. Both ends of the equalizer bar 4 extend on both sides of the vehicle body 1. Reference numerals 5, 5 denote track frames located on both sides of the vehicle body 1. The track frames 5, 5 have idlers 6, 6 mounted through bracket units 7, 7 on the respective front ends of the track frames 5, 5. These bracket units 7, 7 are connected to idler biasing means 8, 8, respectively, which are installed in the parts of the track frames 5, 5 where are slightly forward of the intermediate portions thereof. These idler biasing means 8, 8 arranged to bias the idlers 6, 6 forwardly. Reference numerals 9, 9 denote rods of the idler biasing means 8, 8 connecting the latter with the bracket units 7, 7, respectively, and adapted to be movable forwards and rearwards together with the bracket units 7, 7 relative to the track frames 5, 5. These rods 9, 9 are located in parallel with the track frames 5, 5. The rods 9, 9 are inserted into spherical bearings 10, 10 mounted in both ends of the equalizer bar 4 so that the rods 9, 9 may be moved freely in the axial direction thereof relative to the equalizer bar 4. Thus, the approximately intermediate portions of the track frames 5, 5 are connected through the equalizer bar 4 to the main frame 1a so as to be movable freely in the vertical direction.

On the other hand, horizontally and outwardly extending pivot shafts 15, 15 are mounted on both sides of the rear part (on the right side of the equalizer bar 4 in FIGS. 1 and 2) of the main frame 1a. One end of each of movable or oscillating links 16, 16 is pivotally connected to each of the pivot shafts 15, 15. The other end of each of the movable links 16, 16 is pivotally connected through each of pivot shafts 18, 18 to each of brackets 17, 17 which project upwards from the upper surfaces of the rear parts of the track frames 5, 5. Thus, the respective rear parts of the track frames 5, 5 are also connected to the main frame 1a so as to be movable freely in the vertical direction through the movable links 16, 16 adapted to be movable or oscillatory vertically about the pivot shafts 15, 15, respectively.

Further, the arrangement is made such that, when the rear portion of each track frame 5 is moved upwards or downwards about the pivot shaft 15, the rearward or forward movement of the track frame 5 relative to the equalizer bar 4 may be absorbed by the sliding movement of the rod 9 relative to each of the spherical bearings 10, 10 mounted in both ends of the equalizer bar 4.

Further, one end of each of shock absorber means 20, 20 is pivotally mounted on the rear end of each of track frames 5, 5, while the other end of each of shock absorber means 20, 20 is pivotally mounted on the vehicle body 1. Thus, the respective rear ends of the track frames 5,5 are supported resiliently relative to the vehicle body 1.

Mounted on both sides of the vehicle body 1 and rearwardly of the track frames 5, 5 are final reduction gears 29, 29 with rotating shafts 30, 30 thereof. Drive sprocket wheels 31, 31 are fixedly secured to the rotating shafts 30, 30, of the final reduction gears 29, 29, respectively.

A plurality of lower bogie wheels 32 are mounted at space intervals on the lower part of each track frame 5. An endless track chain 33 is trained around the aforementioned drive sprocket wheels 31, the lower bogie wheels 32 and the idler sprocket wheel 6 mounted in the front part of the track frame 5. Reference numeral 34 denotes a stopper which abuts against the upper surface of the rear part of the movable link 16 to limit upward or downward movement of the rear portion of each track frame 5.

Figure 6:
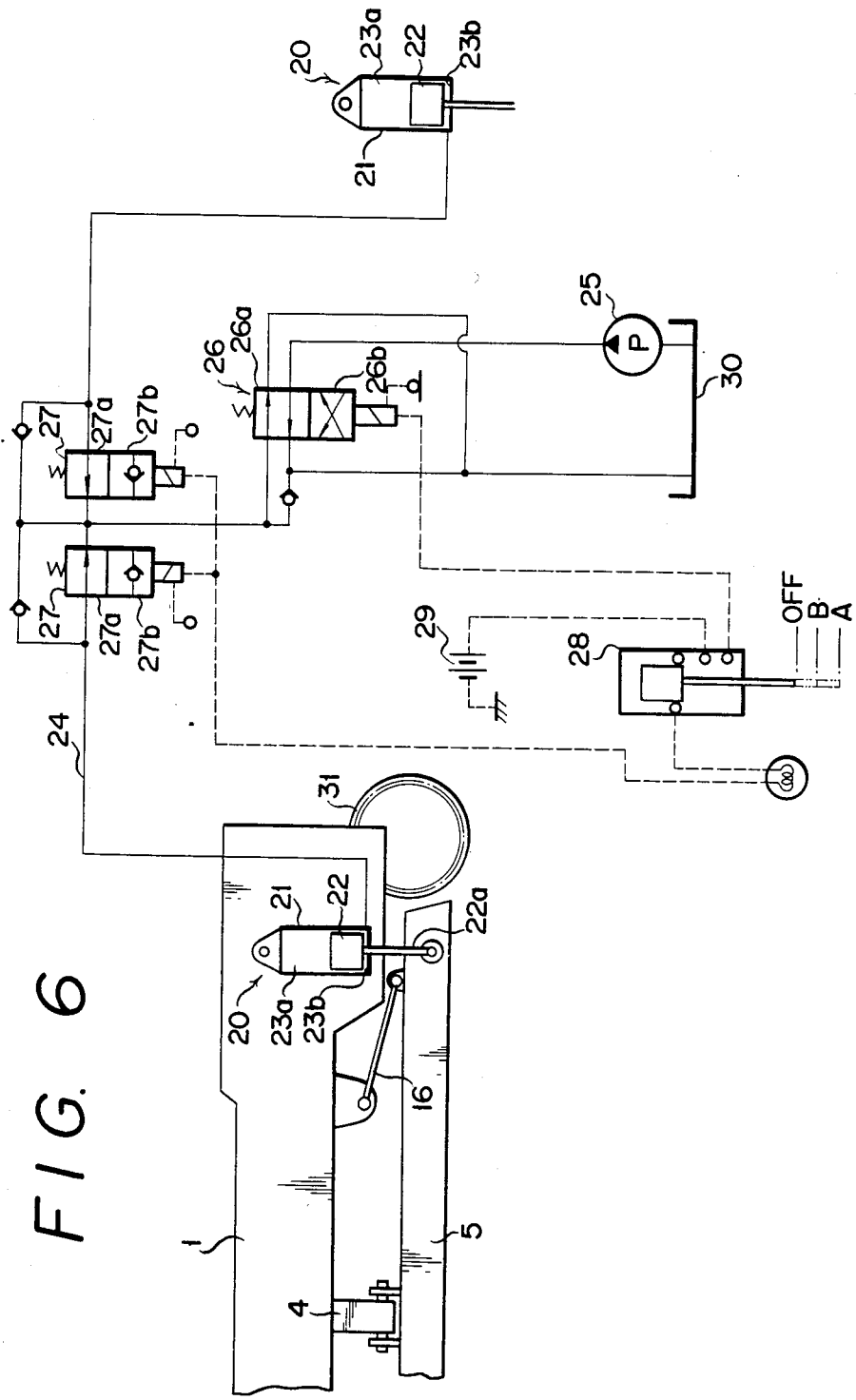
FIG. 6 is a schematic construction explanatory view of means for controlling shock absorbing action of shock absorber means for the suspension assembly of the present invention.

Each of the abovementioned shock absorber means 20, 20 comprises, as shown in FIG. 6, a suspension cylinder 21 whose one end is pivotally connected to the vehicle body 1, and a piston 22 which is slidably fitted into the suspension cylinder 21 and having a piston rod 22a whose leading end is connected to the track frame 5. The bottom chamber 23a of the suspension cylinder 21 is filled with a high pressure inert gas such as, for example, nitrogen ($N_2$) gas, a shock absorbing action is obtained by resilient changes in the volume of the high pressure inert gas. Defined in the rod side of the suspension cylinder 21 of the above-mentioned shock absorber means 20 is a pressurized fluid chamber 23b which is connected through a fluid conduit 24 to a pressurized fluid source 25. The fluid conduit 24 includes a connection and disconnection changeover valve 26 and suspension lock changeover valves 27, 27 connected in turn from the side of the pressurized fluid source 25. The changeover valve 26 has a connecting or communicating position 26b where the fluid from the pressurized fluid source 25 is allowed to flow into the conduit 24, and a disconnecting or shut-off position 26a where the fluid is drained. On the other hand, the suspension lock changeover valve 27 has a communicating position 27a and a counter flow preventing position 27b where the fluid is allowed to flow only in the direction from the changeover valve 26 to the fluid chamber 23b. Both the above-mentioned changeover valves 26, 27 are of a solenoid operated type. And, solenoids of the changeover valves 26, 27 are connected through a switch 28 with the electric power source 29. When the switch 28 is turned off, both the suspension lock changeover valves 27, 27 occupy their respective communicating positions 27a, 27a so that the pressurized chambers 23b, 23b are communicated with a fluid reservoir 30 thereby causing the shock absorber means 20 to effect a shock absorbing function. On the other hand, when the switch 28 is located at its first stage position A, the connection and disconnection changeover valve 26 will occupy its communicating position 26b while the suspension lock changeover valves 27, 27 remain at their respective communicating positions 27a, 27a so that pressurized fluid is supplied into the fluid chambers 23b, 23b of the suspension cylinder 21. Accordingly, the piston rods 22a, 22a of the shock absorber means 20, 20 are retracted within the suspension cylinders 21, 21, respectively, against the pressure due to the high pressure inert gas so that a suspension lock condition is made in such a manner that the vehicle height is reduced.

If, in the next place, the switch 28 occupies its second stage position B, both suspension lock changeover valves 27, 27 will occupy their respective counter flow preventing positions 27b, 27b so as to maintain the suspension lock condition to block up the pressurized fluid within the fluid chambers 23b, 23b, and the changeover valve 26 will occupy its disconnecting position 26a to drain the pressurized fluid from the pressurized fluid source 25.

In the aforementioned arrangement of the present invention, when the load from the ground surface is exerted unevenly on the track frames 5, 5 in the longitudinal direction through the endless track chains 33, 33 the front and rear parts of the track frames 5, 5 swing vertically and the shock of the swing is absorbed by the shock absorber means 20, 20. Whilst, if the switch 28 is shifted from OFF position to the first stage position A and, after a predetermined time, further shifted to the second stage position B, the piston rods 22a, 22a of the shock absorber means 20, 20 is retracted so that a suspension lock condition is achieved in such a manner that the vehicle height is kept low.

The suspension assembly for track-type vehicles according to the present invention is not to be limited to the arrangement of the aforementioned embodiment and includes the following arrangement.

Figure 7:
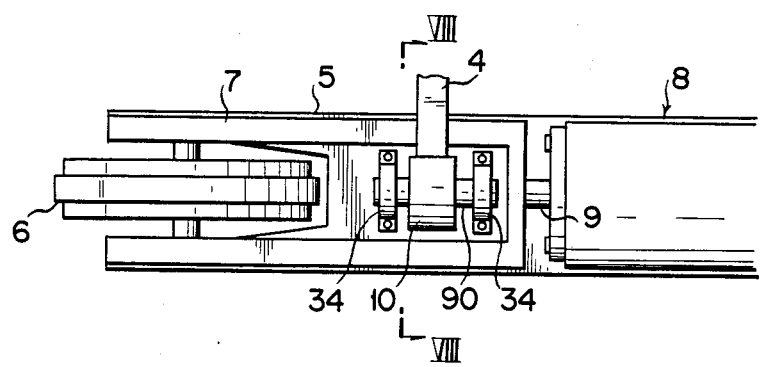
FIGS. 7 and 8 are a schematic fragmentary plan view and a fragmentary longitudinal sectional view, respectively, of another embodiment of suspension assembly of the present invention.
Figure 8:
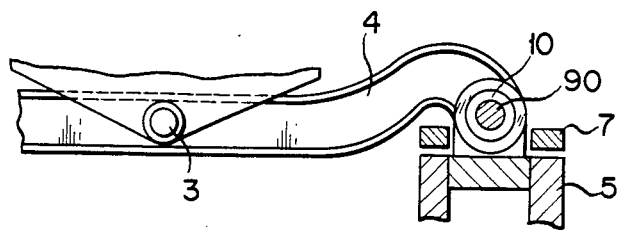

First, the rods interposed for connecting the leading ends of the equalizer bar 4 to the track frames 5, 5 are not limited to the rods 9, 9 of the idler biasing means 8, 8. In brief, as shown in FIGS. 7 and 8, other pivot shafts 90, 90 independent from the rods 9, 9 of the biasing means 8, 8 are slidably inserted into spherical bearings 10, 10 mounted in the leading ends of the equalizer bar 4 and each of which extends in parallel with the track frame 5. Both end portions of the pivot shaft 90 projecting out from the leading end of the equalizer bar 4 are engaged with brackets 34, 34 projecting upwards from the upper surface of the track frame 5 and located adjacent to the front and rear of the leading end of the equalizer bar 4. In the similar manner as the aforementioned embodiments (refer to FIGS. 1, 3 and 5), this connecting mechanism enables each of the track frames 5, 5 to be connected to the main frame 1a of the vehicle body so that each track frame 5 may be movable freely in the vertical direction at its approximately intermediate portion thereof by the equalizer bar 4 and also may be movable freely in the longitudinal direction by the connecting mechanism including the pivot shaft 90. Further, in FIGS. 7 and 8, the pivot shafts 90, 90 and brackets 34, 34 are located between the brackets 7, 7 carrying the idler sprocket wheels 6, 6, respectively, but they may be located at a position a little bit offset the position where is, for example, the respective insides the track frames 5, 5.

Further, in the first embodiment, as shown in FIG. 2, the other end of the movable or oscillating link 16 pivotally connected to the pivot shaft 15 extends to the rear of the track frame 5, and the leading end of the movable link is pivotally connected through the pivot shaft 18 to the bracket 17 projecting upwards from the track frame 5. However, the other end of the movable link 16 may extend to the front side of the track frame 5 relative to the pivot shaft 15 and may be pivotally connected through a rod to a bracket projecting upwards from the track frame 5.

In the track-type vehicle comprising the suspension assembly of the present invention, when the vehicle is running, the rear ends of the track frames 5, 5 are pushed downwards by the biasing action of the suspension cylinders 21, 21 of the shock absorber means 20, 20, and therefore the lower running portions of the endless track chains 33, 33 trained around the drive sprocket wheels 31, 31, respectively, will depart from the teeth of the latter. As a result, since the shock caused by running on uneven road surfaces is not transmitted directly to the drive sprocket wheels 31, 31, the final reduction gears 29, 29 and the drive sprocket wheels 31, 31 are protected from the shock thereby achieving increased durability thereof. Further, when the vehicle is running, the front and rear parts of the track frames 5, 5 can movable up or down freely in accordance undulations of road surfaces thereby achieving improved stability when running, and since shock and vibrations from road surfaces are damped or absorbed by the shock absorber means 20, 20 provided between the track frames 5, 5 and the vehicle body 1, improved comfortable driving can be made. Further, when the shock absorber means 20, 20 are subjected to an increased pressure by the load added during operation, the rear ends of the track frames 5, 5 move upwards to allow the endless track chains 33, 33 trained around the drive sprocket wheels 31, 31 to contact with the ground surface. Therefore, the length of the portions of the track chains 33, 33 which are brought into contact with ground surface will increase, resulting in increased tractive force and also increased stability when running. Moreover, the improvement of the present invention resides in the simple construction wherein the movable links 16, 16 and shock absorber means 20, 20 are added, and therefore it is possible to manufacture the suspension assembly inexpensively and readily. Furthermore, according to the present invention, since the shock absorber means 20, 20 are provided with means for locking the shock absorbing action, the shock absorber means 20, 20 can be locked to stabilize the vehicle in operation, and can give outstanding effect, in particular, in operations which require high stability for the vehicle body and in crane vehicles used for operations in stationary state.

It is to be understood that the foregoing description is merely illustrative of preferred embodiments of the invention, and that the invention is not to be limited thereto, but is to be determined by the scope of the appended claims.

What I claim is:

1. In a track-type vehicle having a main body and a main frame, a suspension assembly comprising:
   (a) a pair of left and right track frames mounted on both sides of said main frame;
   (b) a pair of left and right pivot shafts projecting outwardly and horizontally from the rear part of said main frame;
   (c) a pair of left and right movable links each having one and pivotally connected to each of said pivot shafts and the other end pivotally connected through a pivot shaft to each of brackets projecting upwards from the upper surfaces of said track frames, said links extending rearwardly from said main frame pivot shafts to said track frame brackets;
   (d) shock absorber means pivotally connected between both sides of the rear part of said main frame and the respective rear parts of said track frames;
   (e) an equalizer bar pivotally mounted on the part of said main frame which is slightly forward of the longitudinal intermediate portion thereof and on the transversely central, lower part of the vehicle body, the vertically freely movable both ends of said equalizer bar extending, respectively, to the track frames;
   (f) means for slidably connecting both ends of said equalizer bar and the parts of said track frames which are in a forward portion of the track frames; and
   (g) control means for controlling the shock absorbing action of said shock absorber means.

2. The track-type vehicle as claimed in claim 1, characterized in that each of said shock absorber means comprises a suspension cylinder whose one end is pivotally connected to the vehicle body, and a piston which is slidably fitted into said cylinder and whose one end is pivotally connected through a rod to each of the track frames, said cylinder having a bottom side pressure chamber separating by said piston which is filled with a high pressure inert gas.

3. The track-type vehicle as claimed in claim 1, characterized in that each of said connector means comprises a spherical bearing mounted on each end of the equalizer bar and a rod inserted slidably in its axial direction into said bearing so as to be located in parallel with said track frame whose one end is connected to a bracket means for carrying an idler sprocket wheel and whose the other end is connected to an idler sprocket wheel biasing means fixedly secured to the upper surface of said track frame where is an approximately intermediate portion thereof.

4. The track-type vehicle as claimed in claim 1, characterized in that each of said connector means comprises a spherical bearing mounted on each end of the equalizer bar and a pivot shaft inserted slidably in its axial direction into said bearing so as to be located in parallel with said track frame and whose both ends are projected out from each end of said bearing and pivotally connected to a pair of brackets fixedly mounted on the upper surface of said track frame.

5. The track-type vehicle as claimed in claim 4, characterized in that said pair of brackets are mounted on the inside of said track frame.

6. The track-type vehicle as claimed in claim 1, characterized in that said control means comprises a pressure chamber defined on the rod side of said suspension cylinder, a hydraulic pump, a pressurized fluid conduit connecting said pressure chamber and said hydraulic pump, a connection and disconnection changeover solenoid valve installed in said fluid conduit; a pair of suspension lock solenoid changeover valves installed in said conduit between said connection and disconnection changeover solenoid valve and said pressure chamber; and an electric switch adapted to actuate said pair of solenoid changeover valves.

7. The track-type vehicle as claimed in claim 1, characterized in that said brackets for pivotally connecting with respective other ends of said movable links are fixedly mounted on the upper surfaces of said track frames at the respective rear portions of the latter, respectively.

8. The track-type vehicle as claimed in claim 1, characterized in that said brackets for pivotally connecting with respective other ends of said movable links are fixedly mounted on the upper surfaces of said track frames at the respective intermediate portions of the latter, respectively.

* * * * *